US008782482B2

(12) United States Patent
Bergman

(10) Patent No.: US 8,782,482 B2
(45) Date of Patent: Jul. 15, 2014

(54) METHOD AND SYSTEM TO IMPROVE LINK BUDGET OF A WIRELESS SYSTEM

(75) Inventor: Aran Bergman, Givatayim (IL)

(73) Assignee: Intel Corporation, Santa Clara, CA (US)

( * ) Notice: Subject to any disclaimer, the term of this patent is extended or adjusted under 35 U.S.C. 154(b) by 664 days.

(21) Appl. No.: 12/502,857

(22) Filed: Jul. 14, 2009

(65) Prior Publication Data

US 2011/0016369 A1   Jan. 20, 2011

(51) Int. Cl.
*H04L 1/18* (2006.01)
(52) U.S. Cl.
USPC .......................................... 714/749; 370/330
(58) Field of Classification Search
USPC .......................................... 714/749; 370/330
See application file for complete search history.

(56) References Cited

U.S. PATENT DOCUMENTS

| | | | | |
|---|---|---|---|---|
| 2006/0233127 | A1* | 10/2006 | Derryberry et al. | 370/328 |
| 2008/0095109 | A1* | 4/2008 | Malladi et al. | 370/330 |
| 2008/0133995 | A1* | 6/2008 | Lohr et al. | 714/748 |
| 2008/0192622 | A1* | 8/2008 | Scheim et al. | 370/210 |
| 2009/0103561 | A1 | 4/2009 | Qi et al. | |
| 2009/0285160 | A1* | 11/2009 | Cheng et al. | 370/328 |
| 2009/0307554 | A1* | 12/2009 | Marinier et al. | 714/748 |

FOREIGN PATENT DOCUMENTS

| | | |
|---|---|---|
| EP | 1657845 | 5/2006 |
| TW | 595843 U | 6/2004 |
| TW | 200922191 A | 5/2009 |

OTHER PUBLICATIONS

IEEE Computer Society and The IEEE Microwave Theory and Techniques Society, Air Interface for Fixed and Mobile Broadband Wireless Access Systems, Feb. 28, 2006, 864 pages, New York, New York, USA.
Shkumbin Hamiti, IEEE 802.16m System Description Document, Apr. 10, 2009, 180 pages.
International Search Report and Written Opinion for International Patent Application No. PCT/US2010/041520, Mailed Feb. 23, 2011, 10 pages.
Office Action issued Apr. 17, 2013 from Korean Patent Application No. 10-2012-7003781.
Office Action issued Jun. 18, 2013 from Taiwan Patent Application No. 99122832.
Office Action for Japanese Patent Application No. 2012-520682, issued on Aug. 13, 2013.
CN Office Action dated Dec. 16, 2013 for CN Application No. 201080041835.1, 34 pages.

* cited by examiner

*Primary Examiner* — M. Mujtaba K Chaudry
(74) *Attorney, Agent, or Firm* — Schwabe, Williamson & Wyatt, P.C.

(57) ABSTRACT

A method and system to improve the link budget of a wireless system using fast Hybrid Automatic Repeat Request (HARQ) protocol. In one embodiment of the invention, the Medium Access Control (MAC) logic in a base station determines whether the quality of the communication link with a mobile station is bad. When the MAC logic in the base station determines that the quality is bad, the base station uses a fast Hybrid Automatic Repeat Request (HARQ) protocol to indicate to the mobile station to send identical information to the base station in each of a plurality of successive or consecutive communication intervals before processing any received identical information from the mobile station. The fast HARQ protocol reduces the latency of receiving the identical information correctly, as compared with the current HARQ protocol.

18 Claims, 5 Drawing Sheets

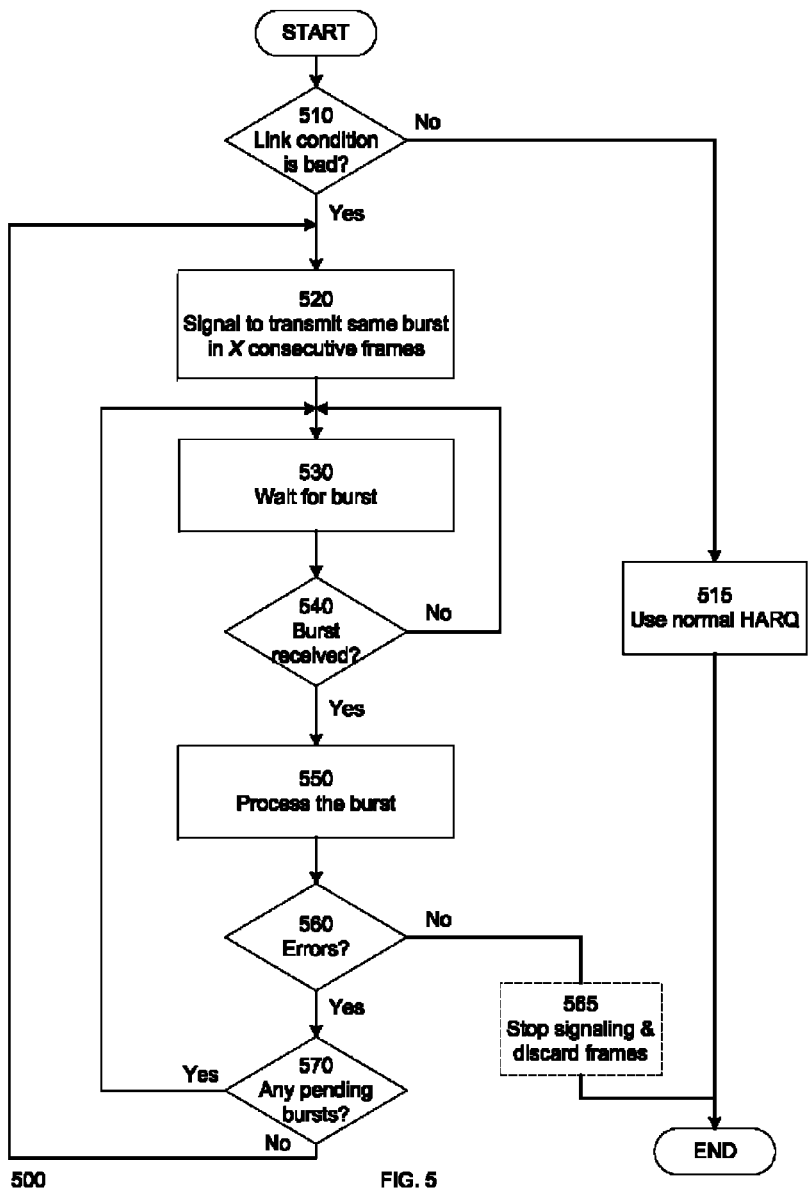

US 8,782,482 B2

METHOD AND SYSTEM TO IMPROVE LINK BUDGET OF A WIRELESS SYSTEM

FIELD OF THE INVENTION

This invention relates to the field of wireless communication, and more specifically but not exclusively, to improve the link budget of a wireless system using fast hybrid automatic repeat request protocol.

BACKGROUND DESCRIPTION

In a wireless system, the receiving node typically needs to receive a minimum power level per tone of the transmitted information burst. A Hybrid Automatic Repeat Request (HARQ) protocol allows retransmission of the information burst by the transmitting node and combining the received information bursts in the receiving node to effectively increase the received power per tone. The transmitting node can gain about 3 decibels (dB) with the same power per tone by retransmitting the original information burst. If the information burst is retransmitted 3 times, i.e., a total of 4 transmissions of the same information burst, the transmitting node can gain about 6 dB compared to a single transmission of the information burst.

FIG. 1A illustrates a prior art timeline 100 of the communication exchanges between a base station and a mobile station operating in accordance with HARQ. The prior art timeline 100 shows five frames 102, 104, 106, 108, and 110. In frame x 102, the base station sends a HARQ uplink Medium Access Protocol Information Element (HARQ UL MAP IE) 120 to the mobile station. The HARQ UL MAP IE 120 indicates to the mobile station to send particular information to the base station. In frame x+1 104, the mobile station sends a HARQ UL transmission (HARQ UL TX) burst 122 of the particular information to the base station in response to the HARQ UL MAP IE 120.

The base station receives the HARQ UL TX burst 122 and processes it to check for any errors. The received HARQ UL TX burst 122 is assumed to have an error in this example and the base station sends another HARQ UL MAP IE 124 in frame x+3 108 to indicate to the mobile station to retransmit the particular information again. After receiving the UL MAP 124, the mobile station sends a HARQ UL retransmission (HARQ UL reTX) burst 126 of the particular information to the base station in frame x+4 110.

The time interval between HARQ UL TX burst 122 and HARQ UL reTX burst 126 is denoted as HARQ Round Trip Time (RTT) 132 and is assumed to be 3 frames for the purpose of illustration. The HARQ RTT is the minimum time between a transmission of a particular information burst and the retransmission of the particular information (or a new transmission of another information burst) in the same HARQ channel.

Repetition coding is another technique that can increase reliability of the transmission. For example, a repetition coding scheme with a repetition factor of two, repeats two times for each bit that is to be transmitted and the number of slots required for transmission is doubled as shown in FIG. 1B. If the transmitting node is limited by the total power that it can transmit, repetition coding does not help in increasing the reliability of the transmission. This is because the power per tone needs to be halved in order to transmit twice as many tones, assuming that the transmission requires the maximum total power when no repetition coding is used.

BRIEF DESCRIPTION OF THE DRAWINGS

The features and advantages of embodiments of the invention will become apparent from the following detailed description of the subject matter in which:

FIG. 5 illustrates a flow chart of the steps to improve the link budget of a wireless system in accordance with one embodiment of the invention.

DETAILED DESCRIPTION

Figure 1A:
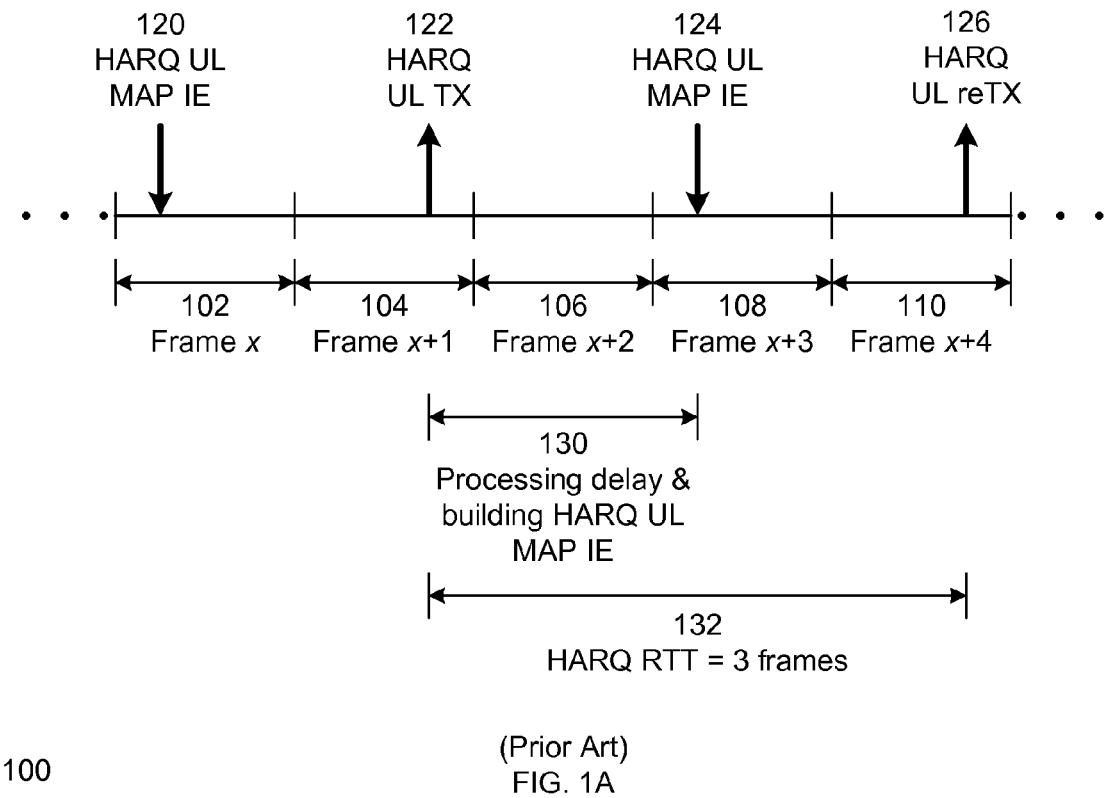
FIG. 1A illustrates a prior art timeline of the communication exchanges between a base station and a mobile station operating in accordance with a hybrid automatic repeat request protocol.
Figure 1B:
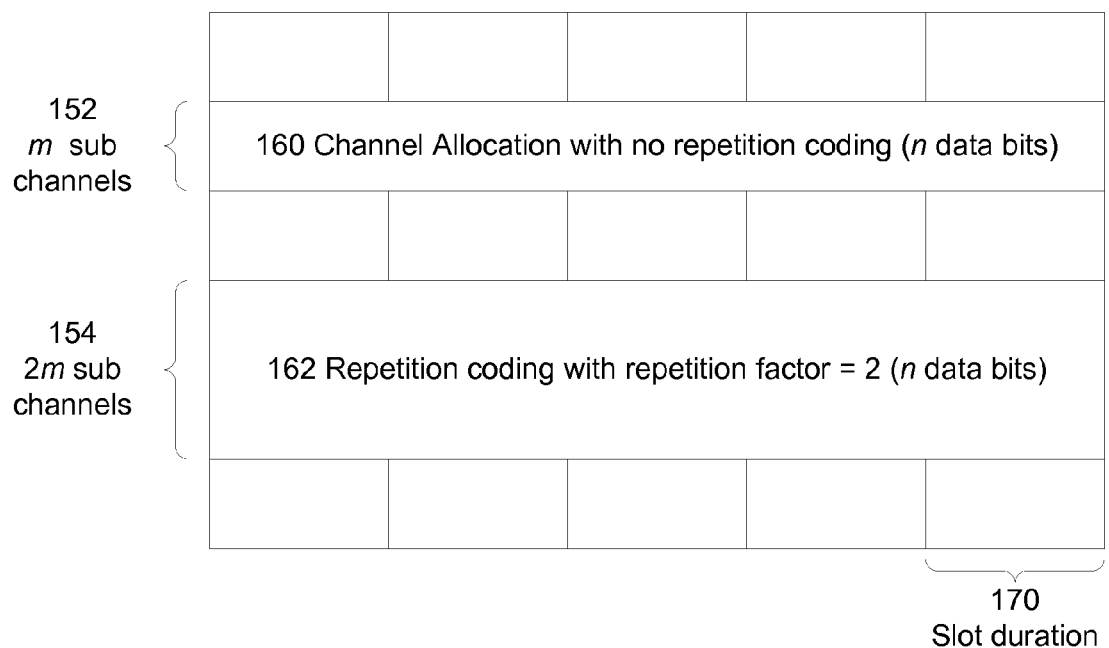
FIG. 1B illustrates a prior art channel allocation with and without repetition coding.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and system to improve the link budget of a wireless system using fast HARQ. The fast HARQ is compliant at least in part, with the HARQ protocol. In one embodiment of the invention, the wireless system includes, but is not limited to, two or more nodes capable of exchanging information wirelessly. The node includes, but is not limited to, a base station, a mobile or remote station, a desktop computer, a laptop computer, a notebook computer, a netbook computer, a personal digital assistant (PDA), a server, a workstation, a cellular telephone, a mobile computing device, and the like.

In one embodiment of the invention, the nodes communicate using a communication standard that includes, but is not limited to, one of the Institute of Electrical and Electronics Engineers (IEEE) 802.16 family of standards, 3rd Generation Partnership Project (3GPP) Long Term Evolution (LTE) standard, High-Speed Downlink Packet Access (HSDPA) standard, or any other wired or wireless communication standard capable of implementing or using HARQ protocol.

Figure 2:
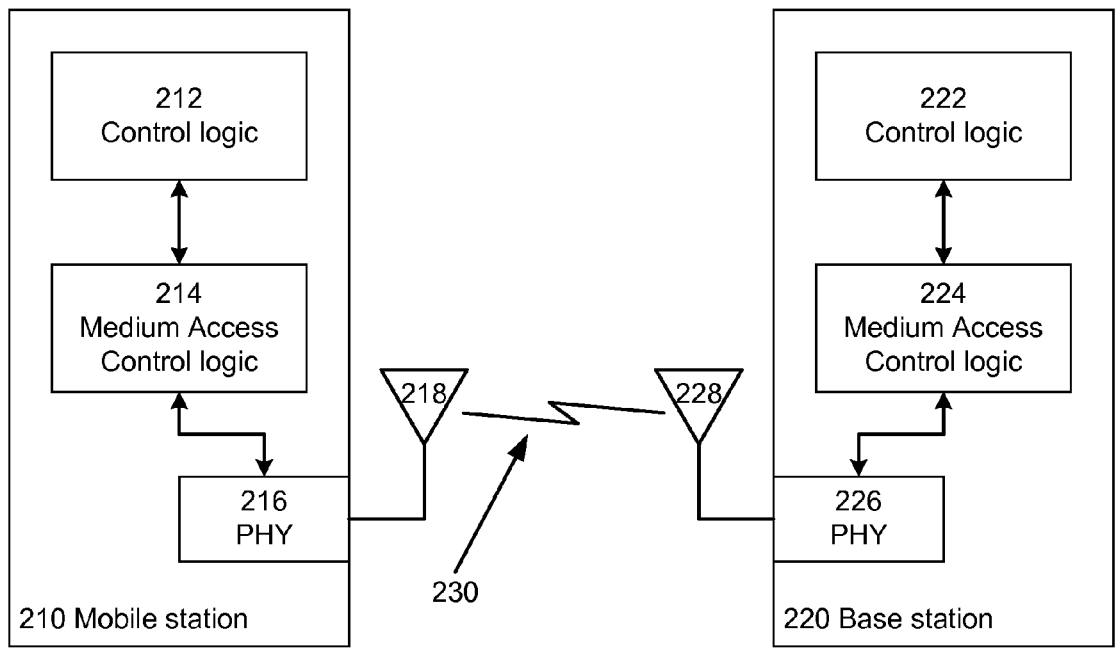
FIG. 2 illustrates a wireless system in accordance with one embodiment of the invention.

FIG. 2 illustrates a wireless system 200 in accordance with one embodiment of the invention. For clarity of illustration, only one mobile station 210 and one base station 220 are shown in the wireless system 200. The wireless system 200 may include more than one base station 220 and each base station 220 may support more than one mobile station 210.

In one embodiment of the invention, the mobile station 210 has control logic 212 coupled with the medium access control (MAC) logic 214. The control logic 212 allows the mobile station 210 to function as a wireless station in accordance with the wireless communication protocol(s) described herein. The MAC logic 214 controls the signaling between the mobile station 210 and the base station 220, and also controls the physical (PHY) layer logic 216 that is coupled with antenna 218.

In one embodiment of the invention, the base station 220 has control logic 222 coupled with the MAC logic 224. The control logic 222 allows the base station 220 to function as a wireless station in accordance with the wireless communication protocol(s) described herein. It can also facilitate information exchanges between mobile stations connected with the base station 220. The MAC logic 224 controls the signaling between the base station 220 and the mobile station 210, and also controls the PHY layer logic 226 that is coupled with antenna 228. The antennas 218 and 228 are communicating via a communication link or channel 230 that is wireless. The quality or reliability of the communication link 230 depends on one or more factors that include, but are not limited to, distance between the antennas 218 and 228, interference from other devices or stations, multi-path loss, cross-talk, mobility of the mobile station, shadowing, multi-path fading, and the like.

In one embodiment of the invention, the MAC logic 224 in the base station 220 determines whether the quality of the communication link 230 with the mobile station 210 is bad. When the MAC logic 224 in the base station 220 determines that the quality is bad, the base station 220 uses a fast HARQ protocol to indicate to the mobile station 210 to send identical information to the base station 220 in each of a plurality of successive or consecutive communication intervals before processing any received identical information from the mobile station 210 in one embodiment of the invention. By using the fast HARQ protocol in one embodiment of the invention, the base station 220 uses less time to request a retransmission of a particular burst from the mobile station 210 as it does not need to wait for the processing time to determine that a retransmission of the particular burst is required.

The base station 220 can signal the mobile station 210 in a number of consecutive communication intervals to transmit identical information to the base station 220 before processing any received identical information from the mobile station 210. A wireless system 200 that employs fast HARQ protocol can support traffic with lower latencies as the signaling time between the base station 220 and the mobile station 210 for retransmissions of information is reduced in one embodiment of the invention.

The base station 220 can use a number of different methods to signal to the mobile station 210 to send identical information to the base station 220 in each of a plurality of consecutive communication intervals before processing any received identical information from the mobile station 210. For example, in one embodiment of invention, when the mobile station 210 and the base station 220 are communicating in accordance with IEEE 802.16e-2005 standard (IEEE 802.16e-2005, "IEEE Standard for Local and Metropolitan Area Networks Part 16: Air Interface for Fixed and Mobile Broadband Wireless Access Systems", IEEE Std 802.16e-2005 and IEEE Std 802.16-2004/Cor1-2005), the base station 220 indicates to the mobile station 210 by sending a HARQ UL MAP IE in each of a number of consecutive frames or communication intervals to the mobile station 210. The HARQ UL MAP IE indicates to the mobile station 210 to send the identical information.

In one embodiment of the invention, the base station 220 sets the same ARQ identifier Sequence (AL_SN) field or bit in the HARQ UL MAP IE to indicate to the mobile station 210 to retransmit the same information again. In another embodiment of the invention, the base station 220 sets one or more bits of a register in the mobile station 210 to indicate to the mobile station 210 to transmit the same information in a number of consecutive frames.

In another embodiment of the invention, the base station 220 may use a signaling protocol that is not compliant with HARQ protocol to indicate to the mobile station 210 to transmit the same information in a number of consecutive frames. One of ordinary skill in the relevant will readily appreciate that other methods of indicating or signaling can be utilized without affecting the workings of the invention and these other methods can be applied to the invention.

The control logic, MAC logic, and the PHY layer logic in the mobile station 210 and the base station 220 can be implemented in any combination of hardware, software and/or firmware. In addition, one or more functionalities of a block may be also performed at least in part by another block. For example, in one embodiment of the invention, the control logic 222 may perform, in place of the MAC logic 224, one or more functionalities of the MAC logic 224.

Figure 3:
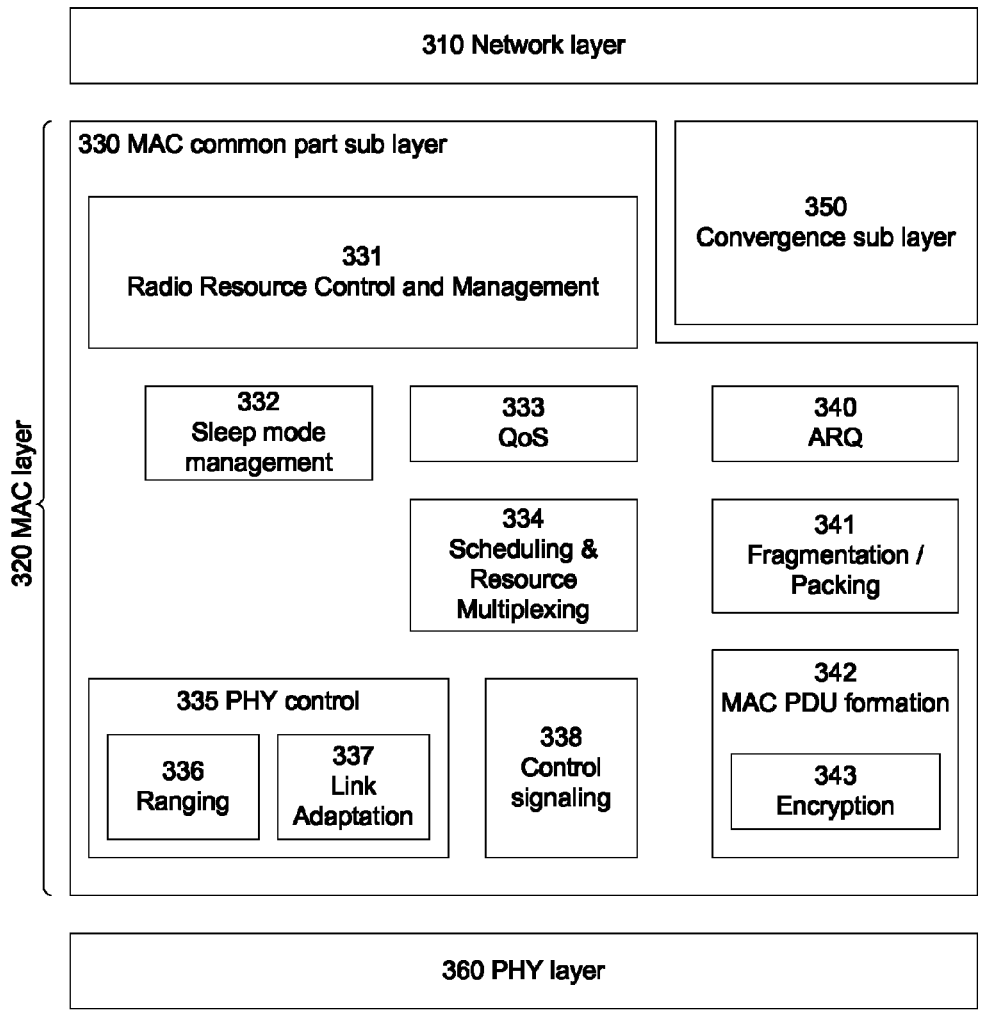
FIG. 3 illustrates a protocol structure of a node according to one embodiment of the invention.

FIG. 3 illustrates a protocol structure 300 of a node according to one embodiment of the invention. The protocol structure 300 is compliant at least in part, with the IEEE 802.16m-08/003r8 System Description Draft (SDD) (IEEE 802.16m-08/003r8 SDD, "IEEE 802.16m System Description Document [Draft]", IEEE 802.16 Broadband Wireless Access Working Group, Apr. 10, 2009).

The protocol structure 300 has a network layer 310, a MAC layer 320, and a PHY layer 360. In one embodiment of the invention, the protocol structure 300 is implemented in a base station 220 to improve the link budget of the wireless system 200 using fast HARQ.

The MAC layer 320 has two sub layers: MAC common part sub layer 330 and the convergence sub layer 350. The convergence sub layer 350 classifies a packet according to classification rules, and maps the packet onto a particular transport connection. If the packet is associated with an ARQ connection, the ARQ block 340 logically splits the packet into ARQ blocks. After scheduling, the packet may be fragmented or packed by fragmentation/packing block 341 and a sub-header is added if necessary. The MAC Protocol Data Unit (PDU) formation block 342 may also encrypt the packet and the sub-headers using encryption block 343 and adds a generic MAC header to form a MAC PDU Unit (MPDU).

The MAC common part sub layer 330 has a Radio Resource Control and Management (RRCM) block 331 that adjusts radio network parameters based on the traffic load, and also performs load control or balancing, admission control and interference control. The sleep mode management block 332 handles sleep mode operation and generates MAC signaling related to sleep operation. The Quality of Service (QoS) block 333 handles QoS management for each connection. The scheduling and resource multiplexing block 334 schedules and multiplexes packets based on the properties of the connections. The sleep mode management block 332 communicates with the scheduling and resource multiplexing block 334 to operate properly according to the sleep period.

The MAC common part sub layer 330 also has a PHY control block 335 that includes a ranging module 336 and a link adaptation module 337. The PHY control block 335 handles the PHY signaling that includes, but is not limited to, ranging using ranging module 336, measurement and/or feedback of the communication link using channel quality information (CQI), HARQ acknowledgement (ACK) and negative ACK (NACK), and the like. In one embodiment of the invention, the PHY control module 335 determines whether the quality of a communication link with a station is bad based on an estimation of the quality of the communication link. The estimation of the quality of the communication link or the link condition is based on one or more factors that include, but are not limited to, CQI, HARQ ACK/NACKs, and the like.

The link adaptation module 337 performs link adaptation by adjusting the modulation and coding scheme (MCS), and/or the power level. In one embodiment of the invention, the link adaptation module 337 uses one or more factors that include, but are not limited to, the estimation of the quality of the communication link, the QoS required for a particular connection and the like, to select the MCS for the particular connection. For example, the link adaptation module 337 may select a Quadrature Phase Shift Keying (QPSK) modulation, rate ½ and a repetition coding scheme of repetition factor 2 to be used by a mobile station 210 when the link condition is bad. The link adaptation module 337 may also select a higher repetition factor when the link condition deteriorates further.

In one embodiment of the invention, the link adaptation module 337 improves the link budget of the wireless system 200 by using fast HARQ protocol. When the link adaptation module 337 detects that a repetition coding scheme is to be used by the mobile station 210, it sends a request to the control signaling module 338 to send an indication to the mobile station to transmit the same information in a number of consecutive frames, where no repetition coding is used in each transmission. In one embodiment of the invention, the link adaptation module 337 sends a request to the control signaling module 338 to signal to the mobile station 210 in each of a plurality of consecutive frames, the transmission of the same information. In another embodiment of the invention, the link adaptation module 337 performs the functionality of the control signaling module 338 and signals to the mobile station 210 in each of a plurality of consecutive frames, the transmission of the same information.

The link adaptation module 337 also detects a repetition factor of the repetition coding scheme in one embodiment of the invention. In one embodiment of the invention, the link adaptation module 337 signals the mobile station 210 in each of a plurality of consecutive frames, where the plurality of consecutive frames is equal to the repetition factor. For example, in one embodiment, if the repetition factor to be set in the repetition coding scheme is four, the link adaptation module 337 sends a request to the control signaling module 338 to signal the mobile station to transmit the same information in four consecutive frames.

In another embodiment of the invention, the link adaptation module 337 does not need to detect or determine the repetition factor to be set in the repetition coding scheme. The link adaptation module 337 sets a fixed number of times for the mobile station to transmit the same information. For example, in one embodiment of the invention, when the link adaptation module 337 determines that the quality of the communication link is bad, it will always send a request to the control signaling module 338 to signal the mobile station 210 to transmit the same information in three consecutive frames. In one embodiment of the invention, when the mobile station 210 and the base station 220 are communicating in accordance with IEEE 802.16e-2005 standard, the control signaling module 338 indicates to the mobile station 210 by sending a HARQ UL MAP IE in each of a number of consecutive frames or communication intervals to the mobile station 210.

One of ordinary skill in the relevant will readily appreciate that other methods to select the number of transmissions can be used and these other methods can be applied without affecting the workings of the invention. In another embodiment of invention, the link adaptation module 337 indicates to the mobile station 210 to send the information without using the repetition coding scheme when it determines that the quality of the communication link is bad. By doing so, the base station can achieve higher link budget without the need to increase the amount of channels in order to use a repetition coding scheme. When the quality of the communication link is bad, it is likely that a retransmission of a particular burst is required by the mobile station 210 in order for the base station 220 to decode the particular burst correctly. Instead of waiting to receive the particular burst and processing the particular burst to determine that the particular burst is received incorrectly, the base station 220 uses a fast HARQ to indicate to the mobile station 210 to retransmit the same particular burst before the processing of the particular burst in one embodiment of the invention.

Although the link adaptation module 337 is described herein to perform the logic for fast HARQ, it is not meant to be limiting. In another embodiment of the invention, the logic to perform fast HARQ can be performed by other blocks in the protocol structure 300. In addition, the protocol structure 300 of the node described in FIG. 3 is not meant to be limiting. One of ordinary skill in the relevant art will readily appreciate that other ways of separating the logical blocks in the protocol structure 300 can be used and these other ways can be applied without affecting the workings of the invention. Similarly, one of ordinary skill in the relevant art will readily appreciate how to apply the logic of HARQ in other wireless communication protocols and these other wireless communication protocols can also be applied without affecting the workings of the invention.

Figure 4:
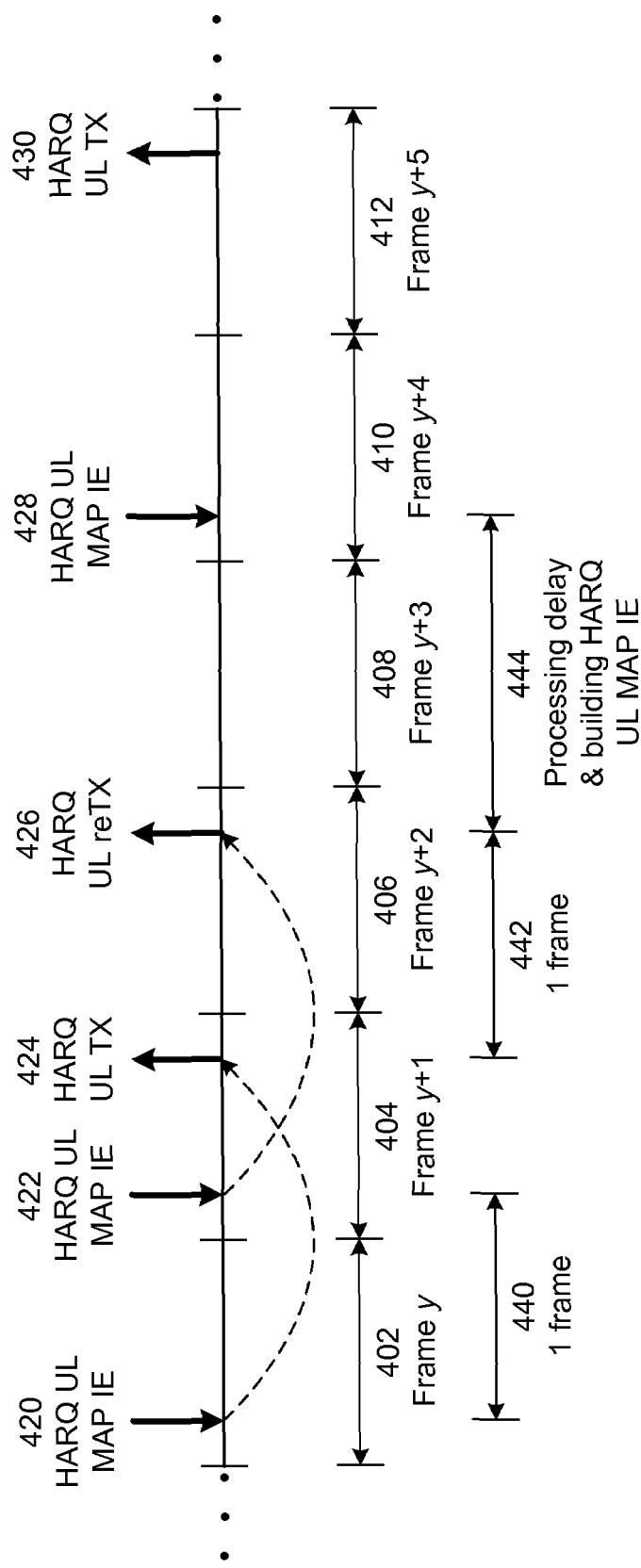
FIG. 4 illustrates a timeline of the communication exchanges between a base station and a mobile station in accordance with one embodiment of the invention.

FIG. 4 illustrates a timeline 400 of the communication exchanges between a base station 220 and a mobile station 210 in accordance with one embodiment of the invention. For the purposes of illustration, the signaling protocol between the base station and the mobile station are assumed to be operable at least with the HARQ signaling protocol in one embodiment of the invention.

The timeline 400 shows six frames 402, 404, 406, 408, 410 and 412. In one embodiment of the invention, the base station 220 determines whether the quality of the communication link with the mobile station 210 is bad. For example, in one embodiment of the invention, the base station 220 detects if a repetition coding scheme is to be used in a transmission of a data burst from the mobile station 210. The use of the repetition coding scheme indicates to the base station 220 that the quality of the communication link with the mobile station 210 is bad. In another embodiment of the invention, the base station 220 estimates the quality of the communication link.

For the purposes of illustration, the base station 220 is assumed to have detected that a repetition coding scheme is to be used by the mobile station and the repetition factor of the repetition coding scheme is set at two. In frame y 402, the base station 220 sends a HARQ UL MAP IE 420 to the mobile station 210. The HARQ UL MAP IE 420 indicates to the mobile station 210 to send or transmit a particular information burst to the base station 220. In one embodiment of the invention, the HARQ UL MAP IE 420 also indicates to the mobile station 210 to send the particular information burst without using the repetition coding scheme.

In frame y+1 404, the base station 220 sends a HARQ UL MAP IE 422 to the mobile station 210. The HARQ UL MAP IE 422 indicates to the mobile station 210 to send the same or identical particular information burst to the base station 220. In one embodiment of the invention, the HARQ UL MAP IE 422 also indicates to the mobile station 210 to send the same particular information burst without using the repetition coding scheme. The base station 220 signals the mobile station 210 to send the same information burst in consecutive frames y 402 and y+1 404 without any processing of the received particular information. Unlike the prior art timeline 100, the base station 220 does not need to wait for the particular information to be received and processed before signaling the mobile station 210 to transmit the same particular information again. This allows the base station 220 to save time when more than one transmission is required before the particular information can be received or decoded successfully.

In frame y+1 404, the mobile station 210 sends a HARQ UL TX burst 424 of the particular information to the base station 220 in response to the received HARQ UL MAP IE 420. Similarly in frame y+2 406, the mobile station 210 sends a HARQ UL reTX burst 426 of the particular information to the base station 220 in response to the HARQ UL MAP IE 422. The mobile station 210 sends the TX bursts in another consecutive number of frames. When the HARQ UL TX burst 424 and the HARQ UL reTX burst 426 are received by the base station 220, the base station 220 processes the bursts to check for any errors. In one embodiment of the invention, the base station 220 processes the bursts by combining the two bursts together and calculates the cyclic redundancy code (CRC) of the combined bursts to determine if the particular information burst is received correctly. The combination of the two bursts is performed in accordance with, but is not limited to, Chase combining scheme, incremental redundancy scheme and the like. One of ordinary skill in the relevant art will readily appreciate that when incremental redundancy scheme is used in the combination of the two bursts, although each burst has different bits originating from the same information block, it does not affect the workings of the invention.

For the purposes of illustration, the particular information burst is assumed to be received correctly and in frame y+4 410, the base station 220 is assumed to have determined that the quality of the communication link between the mobile station 210 and the base station 220 is good. In frame y+4 410, the base station sends a HARQ UL MAP IE 428 to the mobile station 210 to send another particular information burst to the base station 220. In frame y+5 412, the mobile station 210 sends a HARQ UL TX burst of the other particular information burst 430 after receiving the HARQ UL MAP IE 428 from the base station 220. The base station 220 does not send a retransmission request in frame y+4 410 as the base station 220, after combining the HARQ UL TX burst 424 and the HARQ UL reTX burst 426, determines that the calculated CRC of the combined bursts is not corrupted. In one embodiment of the invention, the mobile station 210 uses the same HARQ channel to transmit the HARQ UL TX burst of the other particular information burst 430.

In another embodiment of the invention, the fast HARQ scheme applies to retransmission bursts as well. For example, in one embodiment of the invention, if the base station 220 determines that the CRC of the HARQ UL reTX burst 426 is corrupted, it can requests retransmission in consecutive frames y+5 412 and y+6 (not shown in FIG. 4) of the HARQ UL reTX burst 426. One of ordinary skill in the relevant art can use the fast HARQ scheme in other scenarios of the HARQ protocol and it does not affect the workings of the invention.

Although the base station 220 is illustrated as the node to use fast HARQ to improve the link budget of the wireless system 200, it is not meant to be limiting. The mobile station 210 can also use fast HARQ to improve the link budget of the wireless system 200 in another embodiment of the invention. One of ordinary skill in the relevant art will readily appreciate how to apply the logic and methods described for fast HARQ in the mobile station 210.

In a scenario when the mobile station 210 is far away from the base station 220 or when the condition of the link condition between the mobile station 210 and the base station 220 is bad, the use of fast HARQ by the base station 220 improves the uplink link budget of the mobile station 210. The mobile station 210 has to transmit information to the base station 220 at high power per tone in order to achieve lower error rate. However, if the mobile station 220 has limited uplink or transmit power, the number of sub channels and slots that it can use is limited. To improve the uplink budget of the mobile station 210, the base station 220 indicates to the mobile station 210 to send identical information in each of a plurality of consecutive communication intervals without any processing of the identical information. The indication is sent by the base station 220 before the first transmission of the identical information is received by the base station 220. In this way, the mobile station 210 effectively increases the received power per tone in the base station 220.

FIG. 5 illustrates a flow chart 500 of the steps to improve the link budget of a wireless system 200 in accordance with one embodiment of the invention. For the purpose of illustration, the steps in flow chart 500 are discussed with reference to a receiving node that is communicating with a transmitting node.

In step 510, the receiving node checks if the link condition between the transmitting node and the receiving node is bad. In another embodiment of the invention, the receiving node detects if a repetition coding scheme is to be used by the transmitting node to transmit information bursts. If no, the receiving node uses normal or conventional HARQ protocol to communicate with the transmitting node and the flow ends. If yes, the receiving node signals or indicates to the transmitting node to transmit the same particular information burst in X consecutive frames to the receiving node in step 520. In one embodiment of the invention, the number X is the repetition factor of the repetition coding scheme that is to be used by the transmitting node. In another embodiment of the invention, the number X is a pre-determined number. In yet another embodiment of the invention, the number X is a variable number that is dependant on factors including, but not limited to, CQI, number of HARQ retransmissions, maximum latency requirements, and the like. The number X can be different for each new transmission or retransmission.

In step 530, the receiving node waits for a burst of the particular information from the transmitting node. In step 540, the receiving node checks if a burst of the particular information is received. If no, the flow goes back to step 530 and continues to wait for a burst of the particular information from the transmitting node. If yes, the receiving node processes the burst of the particular information in step 550. In one embodiment of the invention, the receiving node processes or parses the burst by combining two or more received bursts of the particular information and calculates the CRC of the combined burst.

The receiving node checks the CRC of the burst or combined bursts to check if there is any error in step 560. If there are no errors, the receiving node stops the signaling to the transmitting node if the receiving node has not completed signaling the transmitting node in X consecutive frames in optional step 565. The receiving node also discards burst(s) from the transmitting node if the particular information has been received and/or decoded successfully in optional step 565 and the flow ends.

If there are errors, the receiving node checks if there are pending bursts from the transmitting node that has not been received in step 570. For example, in one embodiment of the invention, the receiving node checks if X bursts have been received to determine if there are pending bursts from the transmitting node that have not been received in step 570. If yes, the flow 500 goes back to step 530 and continues to wait for a burst of the particular information from the transmitting node. If no, the flow 500 goes back to step 520 and signals or indicates to the transmitting node to transmit the same particular information burst in X consecutive frames to the receiving node.

Although the flow 500 has been discussed with reference to frames, it is not meant to be limiting. Other methods of dividing the communication intervals can also be applied without affecting the workings of the invention. In addition, the sequence of the steps in the flow 500 is not meant to be limiting and the sequence may also be interchanged without affecting the workings of the invention.

Figure 6:
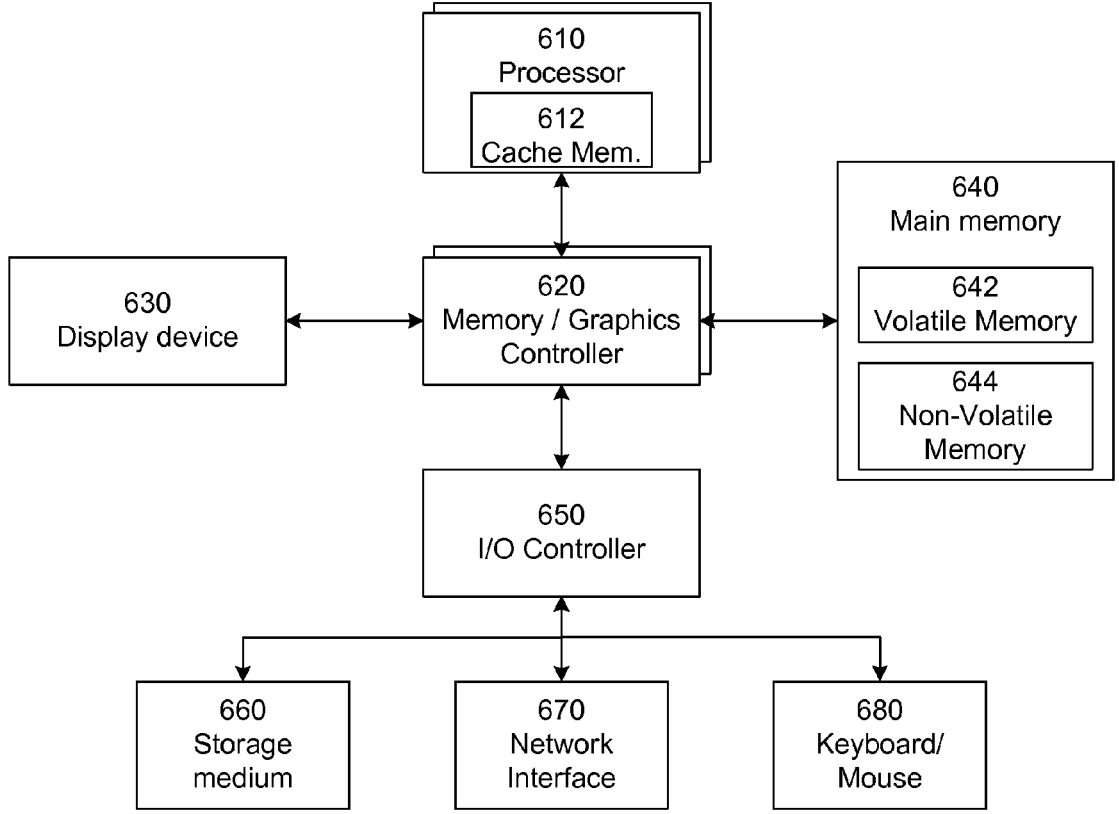
FIG. 6 illustrates a block diagram of a system to implement the methods disclosed herein according with one embodiment of the invention.

FIG. 6 illustrates a system 600 to implement the methods disclosed herein in accordance with one embodiment of the invention. The system 600 includes but is not limited to, a desktop computer, a laptop computer, a notebook computer, a netbook computer, a personal digital assistant (PDA), a server, a workstation, a cellular telephone, a mobile computing device, an Internet appliance or any other type of computing device. In another embodiment, the system 600 used to implement the methods disclosed herein may be a system on a chip (SOC) system.

The system 600 includes a memory/graphics controller 620 and an I/O controller 650. The memory/graphics controller 620 typically provides memory and I/O management functions, as well as a plurality of general purpose and/or special purpose registers, timers, etc. that are accessible or used by the processor 610. The processor 610 may be implemented using one or more processors or implemented using multi-core processors. In another embodiment of the invention, the memory/graphics controller 620 is integrated with the processor 610.

The memory/graphics controller 620 performs functions that enable the processor 610 to access and communicate with a main memory 640 that includes a volatile memory 642 and/or a non-volatile memory 644. The volatile memory 642 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 644 includes, but is not limited to, NAND flash memory, ROM, EEPROM, and/or any other desired type of memory device. The main memory 640 stores information and instructions to be executed by the processor(s) 610. The main memory 640 may also store temporary variables or other intermediate information while the processor 610 is executing instructions.

The memory/graphics controller 620 is connected to a display device 630 that includes, but not limited to, liquid crystal displays (LCDs), cathode ray tube (CRT) displays, or any other form of visual display device. The I/O controller 650 is coupled with, but is not limited to, a storage medium (media) 660, a network interface 670, and a keyboard/mouse 680. In particular, the I/O controller 650 performs functions that enable the processor 610 to communicate with the storage medium 660, the network interface 670, and the keyboard/mouse 680.

The network interface 670 is implemented using any type of well known network interface standard including, but is not limited to, an Ethernet interface, a universal serial bus (USB), a Peripheral Component Interconnect (PCI) Express interface, a wireless interface and/or any other suitable type of interface. The wireless interface allows the system 600 to function as a wireless node or station.

Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems, and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method comprising:
   detecting that a repetition coding scheme is intended to be used in a transmission of an information burst due to a determined quality of a communication link;
   detecting a repetition factor of the repetition coding scheme based on the detection that the repetition coding scheme is to be used;

signaling the transmission of the information burst via a plurality of signals compliant at least in part with a Hybrid Automatic Repeat Request (HARQ) signaling protocol, each signal in the plurality of signals being transmitted in each of a first plurality of consecutive frames; and receiving, responsive to the plurality of signals, the transmission of the information burst in each of a second plurality of consecutive frames wherein the transmission of the information burst does not use the repetition coding scheme;

wherein the number of frames in the first plurality of consecutive frames is equal to the repetition factor.

2. The method of claim 1, wherein each signal in the plurality of signals comprises a HARQ Uplink Medium Access Protocol Information Element (HARQ UL MAP IE).

3. The method of claim 2, wherein each HARQ UL MAP IE in each signal comprises an identical ARQ Identifier Sequence (AL_SN) field.

4. The method of claim 1, further comprising:
combining at least two received transmitted information bursts into a combined information burst; and
calculating a cyclic redundancy code (CRC) of the combined information burst.

5. The method of claim 4, wherein combining the at least two received transmitted information bursts is compliant with a chase combing scheme or an incremental redundancy scheme.

6. The method of claim 5, further comprising repeating the step of signaling in each consecutive frame of the first plurality of consecutive frames when a calculated CRC of the combined information burst is incorrect and when all transmitted information bursts in the second plurality of consecutive frames have been received.

7. The method of claim of 4, wherein receiving the transmitted information burst in each consecutive frame of the second plurality of consecutive frames is compliant at least in part with one of a Institute of Electrical and Electronics Engineers (IEEE) 802.16 family of standards, a 3rd Generation Partnership Project (3GPP) Long Term Evolution (LTE) standard or a High-Speed Downlink Packet Access (HSDPA) standard.

8. One or more machine readable storage media having instructions that, when executed, cause a device in a wireless network to:
detect that a repetition coding scheme is intended to be used in a transmission of an information burst from a first transmitter;
detect a repetition factor of the repetition coding scheme based on the detection that the repetition coding scheme is to be used; and
signal the transmission of the information burst to the first transmitter via a plurality of signals transmitted by a second transmitter, each signal in the plurality of signals being transmitted in a frame of a first plurality of consecutive frames and compliant at least in part with a HARQ signaling protocol, the plurality of signals containing indicator data for the first transmitter to transmit the information burst in each of a second plurality of consecutive frames using a transmission method different from the repetition coding scheme;
wherein the number of frames in the first plurality of consecutive frames is equal to the repetition factor.

9. The one or more machine readable storage media of claim 8 wherein each signal in the plurality of signals comprises a HARQ Uplink Medium Access Protocol Information Element (HARQ UL MAP IE).

10. The one or more machine readable storage media of claim 9 wherein each HARQ UL MAP IE comprises an identical ARQ Identifier Sequence (AL_SN) field.

11. The one or more machine readable storage media of claim 8 wherein the instructions, when executed, further cause the device in the wireless network to, upon reception of at least two transmitted information bursts in the second plurality of consecutive frames, combine the at least two received transmitted information bursts into a combined information burst; and
calculate a cyclic redundancy code (CRC) of the combined information burst.

12. The one or more machine readable storage media of claim 11 wherein combining the at least two received transmitted information bursts into a combined information burst is compliant with a chase combining scheme or an incremental redundancy scheme.

13. The one or more machine readable storage media of claim 12 wherein the instructions, when executed, further cause the device in the wireless network to repeat the step of signaling in each consecutive frame of the first plurality of consecutive frames when a calculated CRC of the combined information burst is incorrect and when all transmitted information bursts in the second plurality of consecutive frames have been received.

14. The one or more machine readable storage media of claim 11 wherein the reception of at least two transmitted information bursts in the second plurality of consecutive frames is compliant at least in part with one of Institute of a Electrical and Electronics Engineers (IEEE) 802.16 family of standards, a 3rd Generation Partnership Project (3GPP) Long Term Evolution (LTE) standard or a High-Speed Downlink Packet Access (HSDPA) standard.

15. A first node in a wireless network, the first node comprising:
a receiver configured to receive a plurality of signals, each signal in the plurality of signals compliant with a Hybrid Automatic Repeat Request (HARD) protocol from a second node and each signal of the plurality of signals in a frame of a first plurality of consecutive frames; and
a transmitter configured to, responsive to receiving the plurality of signals, transmit an information burst in each of a second plurality of consecutive frames wherein the transmission of the information burst does not use an intended non-HARQ repetition coding scheme;
wherein the first plurality of consecutive frames is equal to a repetition factor of the intended non-HARQ repetition coding scheme.

16. The node of claim 15 wherein each signal in the plurality of signals comprises a HARQ Uplink Medium Access Protocol Information Element (HARQ UL MAP IE).

17. The node of claim 16 wherein each HARQ UL MAP IE in each signal comprises an identical ARQ Identifier Sequence (AL_SN) field.

18. The node of claim 15 wherein receiving the plurality of signals is compliant at least in part with one of a Institute of Electrical and Electronics Engineers (IEEE) 802.16 family of standards, a 3rd Generation Partnership Project (3GPP) Long Term Evolution (LTE) standard or a High-Speed Downlink Packet Access (HSDPA) standard.

* * * * *